United States Patent [19]
Sturges

[11] Patent Number: 5,634,536
[45] Date of Patent: Jun. 3, 1997

[54] BRAKE FOR MULTI-POSITIONABLE ROTATABLE MEMBER

[75] Inventor: Paul D. Sturges, Newberg, Oreg.

[73] Assignee: A-Dec, Inc., Newberg, Oreg.

[21] Appl. No.: 427,098

[22] Filed: Apr. 21, 1995

[51] Int. Cl.$^6$ ................................................ F16D 63/00
[52] U.S. Cl. ........................... 188/77 R; 16/337; 188/67; 188/83; 188/170; 188/265; 188/130; 188/249; 188/250 H
[58] Field of Search ................. 188/67, 170, 166, 188/77 R, 249, 259, 265, 330, 130, 83, 77 W, 336, 250 H, 74–76; 16/297, 337–349, 374, 375; 267/196, 201; 434/263; 248/921, 922; 294/31.2, 28

[56] References Cited

U.S. PATENT DOCUMENTS

| | | | |
|---|---|---|---|
| 752,881 | 2/1904 | Ball | 188/77 R |
| 1,110,542 | 9/1914 | Hewitt | 188/77 R |
| 1,455,895 | 5/1923 | Thurston | 188/171 |
| 1,642,997 | 9/1927 | Martin | 188/77 R |
| 2,009,120 | 7/1935 | Price | 188/171 |
| 2,085,040 | 6/1937 | Post | 188/170 |
| 2,121,563 | 6/1938 | Fuehrer | 188/77 R |
| 2,404,949 | 7/1946 | De Lisle | 188/166 |
| 2,471,346 | 5/1949 | Peterson et al. | 188/77 R |
| 2,646,081 | 7/1953 | Ritsky | 188/83 |
| 2,687,188 | 8/1954 | Courtois | 188/77 R |
| 2,822,603 | 2/1958 | Ball | 188/170 |
| 2,901,888 | 9/1959 | Swift | 188/77 R |
| 3,148,748 | 9/1964 | Young | 188/171 |
| 3,191,192 | 6/1965 | Midyette, Jr. | 16/338 |
| 3,204,739 | 9/1965 | Moore | 188/67 |
| 3,211,250 | 10/1965 | Wood | 188/166 |
| 3,230,714 | 1/1966 | Redfield | 188/170 |
| 3,356,190 | 12/1967 | Prussak | 188/171 |
| 3,596,739 | 8/1971 | Ramsey et al. | 188/171 |
| 3,661,234 | 5/1972 | Moederndorfer et al. | 188/170 |
| 3,756,354 | 9/1973 | Clark | 188/77 R |
| 3,831,547 | 8/1974 | Bird | 188/170 |
| 3,837,440 | 9/1974 | Prins | 188/77 R |
| 3,878,922 | 4/1975 | McCarthy | 188/72.9 |
| 3,918,346 | 11/1975 | Ziegler | 188/170 |
| 3,982,446 | 9/1976 | Van Dyken | 188/77 R |
| 4,314,500 | 2/1982 | Hoppe | 188/170 |
| 4,778,036 | 10/1988 | Nowak | 188/77 R |
| 4,934,760 | 6/1990 | Myers | 188/216 |
| 5,027,678 | 7/1991 | McCollom | 188/77 R |

*Primary Examiner*—Douglas C. Butler
*Attorney, Agent, or Firm*—Klarquist Sparkman Campbell Leigh & Whinston, LLP

[57] ABSTRACT

The present invention provides a brake that allows an object to rotate continually through its full range of movement, but allows the object to be reliably secured at any position within this range. The object is carried by a brake that includes a deformable cylindrical collar and a lever. Normally, a spring exerts force against the lever, which in turn exerts pressure on the collar, causing the interior diameter of the collar to become smaller. The collar then grasps the rod and prevents the rotation of the brake relative to the rod. A pneumatically controlled piston counters the force of the spring to allow the brake to rotate freely.

16 Claims, 3 Drawing Sheets

5,634,536

BRAKE FOR MULTI-POSITIONABLE ROTATABLE MEMBER

FIELD OF THE INVENTION

The present invention relates generally to a braking mechanism for a multi-positionable rotatable member. More particularly, the present invention provides a brake for positioning the torso of a dental patient simulator.

BACKGROUND OF THE INVENTION

Devices for the simulation and practice of various dental procedures have been described in the art, e.g., in U.S. Pat. Nos. 4,416,634 (Beach) and 5,102,340 (Berlinghoff et al.). These devices generally consist of a head or torso that is rotatably mounted on a stand or table. The torso is provided with a mouth inside which are provided simulated teeth on which dental procedures may be practiced.

It would be advantageous to be able to change the position of the torso to approximate that of a dental patient who is seated or supine. It is also desirable to position the torso to lie close against the stand or table on which it is mounted for convenient storage of the device when not in use. Preferably, the position of the torso could be quickly and easily adjusted, yet reliably fixed at every position throughout its full range of movement. The braking mechanism of the present invention fulfills these and other needs.

SUMMARY OF THE INVENTION

It is an object of the invention to provide a braking mechanism for a multi-positionable rotatable member, such as the torso of an apparatus for the simulation and practice of dental procedures. The mechanism allows the member to rotate continually through its full range of movement but is able to quickly, easily, and reliably secure the object at each position within this range.

To that end, one embodiment of the present invention provides a brake for controlling rotational movement comprising a deformable collar, a lever, a spring member and an actuator member. The collar, which is preferably resilient, serves to clamp a stationary rod or shaft therein. The lever is pivotally mounted adjacent to the collar, so as to have a contact end adjacent to the collar and an arm extending from the contact end.

The spring member and actuator member are both mounted adjacent to the arm. The spring member, which preferably comprises a spring contact member, normally forces the lever to move pivotally in a first direction, thereby deforming the collar and clamping the rod therein. The spring member is preferably adjustably mounted to allow varying the force exerted on the lever. The actuator member, when actuated, counters the force of the spring member, preferably by forcing the lever to move pivotally in a second direction opposite to the first direction, thereby causing the collar to release the rod. It is preferred that the brake further comprise one or more limit members mounted adjacent to the am to limit the pivotal movement of the lever.

In a preferred embodiment, the actuator member comprises a pneumatically driven piston that is extendable into contact with the lever.

In another embodiment, the present invention provides a brake for controlling rotational movement, comprising a resilient collar having an variable interior diameter for clamping a stationary rod or shaft therein; a lever connected to the collar; and a first actuator member connected to the lever, that, when actuated, urges the lever to pivot in a first direction, thereby exerting force on and deforming the collar and reducing the interior diameter thereof. In a preferred embodiment, the brake further comprises a second actuator member, preferably comprising a spring, that is connected to the lever and, when actuated, relieves the force of the lever on the collar, thereby allowing the rotational movement of the collar relative to the rod. It is also preferred that the first actuator member comprises a pneumatically driven piston that is extendable to exert force against with the lever, thereby causing the collar to decrease in diameter and clamps the rotatable member.

In another embodiment, the present invention provides a method for controlling rotational movement comprising the steps of: disposing a stationary rod or shaft within a deformable collar having a support member attached thereto; pivotally mounting a lever on the support member such that one end of the lever is connected to the collar; mounting a spring member on the support member such that the spring member is connected to the lever and acts to urge the lever to pivot, thereby deforming the collar and thereby clamping the rod therein; mounting an actuator on the support member, operable to overcome the action of the spring; and changing the rotational position of the collar with relation to the rod.

Those skilled in the art will appreciate the utility of this invention, which is not limited to the specific embodiments and materials described herein.

The foregoing and other features and advantages of the invention will become more apparent from the following detailed description and accompanying drawings.

DETAILED DESCRIPTION OF A PREFERRED EMBODIMENT

Figure 1:
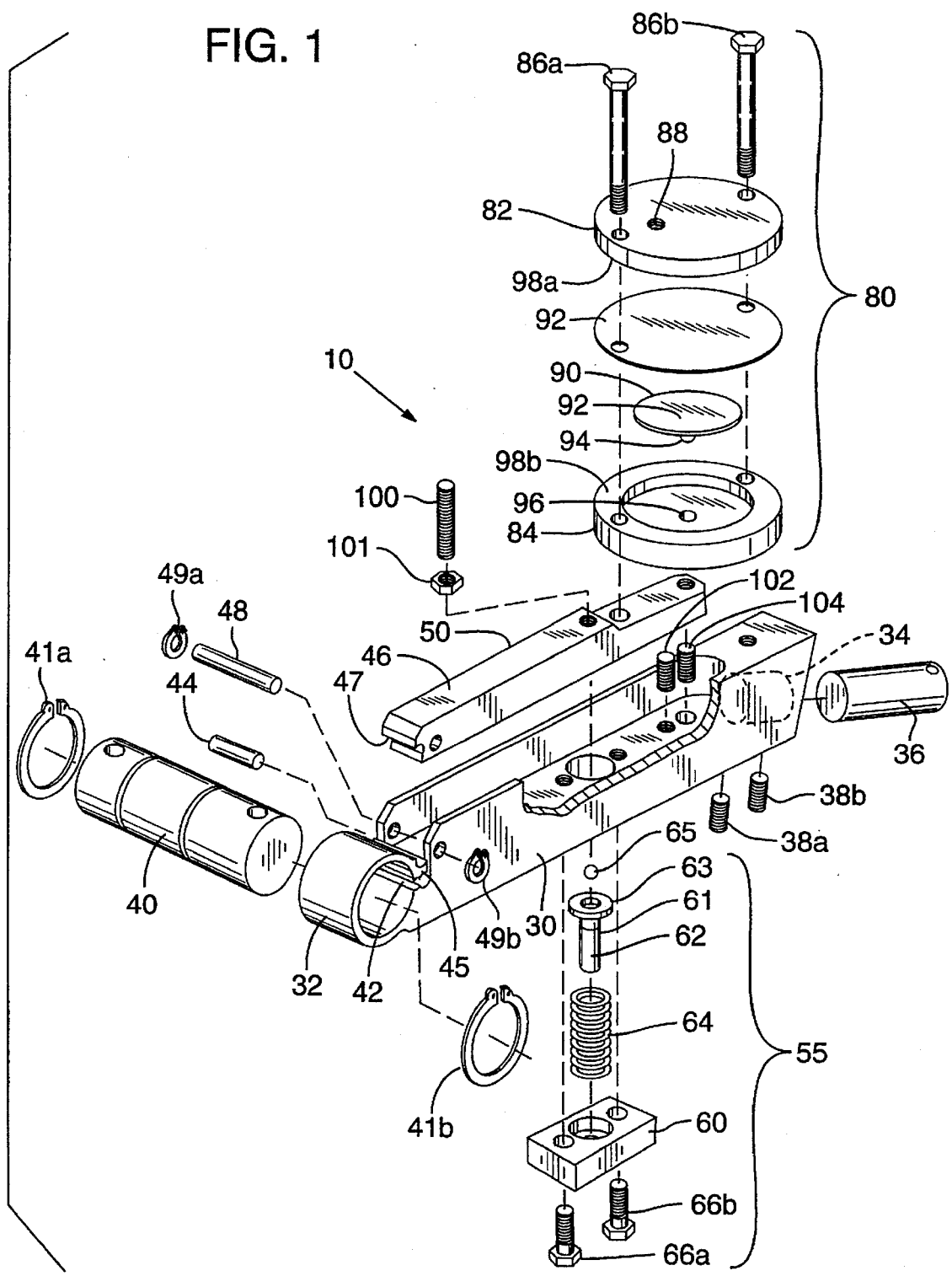
FIG. 1 shows an exploded view of a braking mechanism in accordance with the present invention.

While the present invention is susceptible of embodiment in many different forms and would be useful in a wide variety of apparatus, there is shown in the drawings and will herein be described in detail a preferred embodiment of the invention. The present disclosure is, however, to be considered an exemplification of the principles of the invention and is not intended to limit the broad aspect of the invention to the embodiment illustrated.

Figure 2:
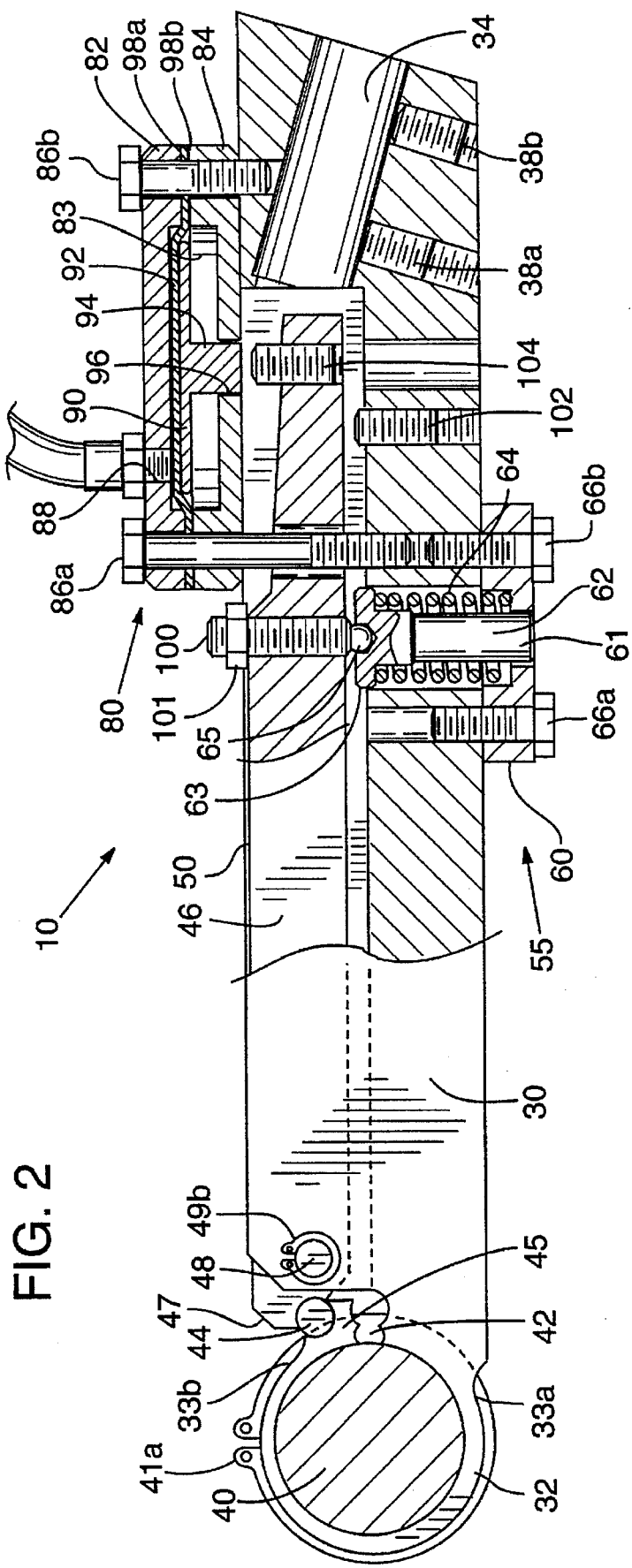
FIG. 2 shows an assembled braking mechanism in side view with a cutaway view of the distal end of the mechanism wherein the brake is of the spring pressure applied and fluid released type.

The braking mechanism 10 of the present invention is shown in an exploded view in FIG. 1 and, in FIG. 2, the assembled braking mechanism is shown in side view with a partial cutaway. The brake includes a brake housing 30. At the proximal end of brake housing 30 is defined an annular friction collar 32. The distal end of brake housing 30 is provided with receptacle 34 that receives a shaft 36. The shaft 36 is held firmly in place by threaded fasteners 38a and 38b.

The inside diameter of friction collar 32 is large enough to surround a rod (or shaft) 40. In a dental simulator, the rod 40 is fixed; a simulated torso (not shown) is disposed about and is carried by the braking mechanism 10, which rotates about the rod 40. The position of the torso may be adjusted to any angular position relative to rod 40 and fixed in place by means of the brake mechanism 10. (Alternatively, when used for other applications, the braking mechanism 10 can be in a fixed position and the rod 40 can be allowed to rotate within collar 32.)

An opening 42 is provided in the otherwise continuous collar 32. Preferably, collar 32 is not of uniform thickness but rather gradually diminishes in thickness from its thickest at point 33a to its thinnest at point 33b, so as to increase its flexibility and to uniformly distribute clamping stress applied against the rod 40 as described below. One end of the collar 32, adjacent to the opening 42, includes a boss 45 that is shaped to receive a rotatable, cylindrical bearing member 44.

Retaining rings 41a, 41b are seated in grooves in rod 40 and spaced to retain between them the collar 32, thus controlling its position on the rod 40. Retaining rings 41a, 41b also serve to prevent bearing member 44 from sliding axially out of position.

A lever 46 is pivotally mounted in the top of brake housing 30. The lever is secured in the brake housing by, and pivots vertically about, fulcrum pin 48, which is disposed across the forward end of the brake housing 30, close to collar 32, and is held in place by retaining rings 49a, 49b (FIG. 1). The proximal end 47 of lever 46 includes a recess shaped to conform to the bearing member 44.

A spring member 55 is mounted to the underside of the housing 30 and urges the lever arm 50 upwardly. Specifically, a spring retainer 60 is fastened to the underside of brake housing 30 with two screws 66a, 66b. The spring retainer 60 is machined so as to receive the end of a plunger 61 and a helical spring 64, which is disposed about the shaft 62 of the plunger 61.

Spring 64 presses against the underside of the flanged head 63 of plunger 61 and urges the head 63 into contact with a spring adjustment screw 100 that is threaded through and protrudes from the underside of lever arm 50 (as oriented in FIG. 2). Lock nut 101 is threadably connected to the portion of spring adjustment screw 100 extending from the upper side of lever arm 50. The plunger head 63 includes a conical recess that receives a ball bearing 65. The end of set screw 100 is shaped so as to conform with the shape of the ball bearing 65, as shown in FIG. 2. Contact between the spring adjustment screw 100 and the ball bearing 65 and plunger head 63 fixes the location of plunger 61 to prevent spring 64 from binding against the sidewalls of brake housing 30.

The spring-based plunger 61 forces the end 47 of lever 46 to press against rotatable bearing member 44. This pressure against rotatable bearing member 44 makes opening 42 smaller, which, in turn, reduces the diameter of collar 32, thereby causing collar 32 to grasp rod 40 firmly to prevent rotation of the braking mechanism 10 about the rod 40.

An actuator assembly 80 is mounted to the top of the brake housing 30 and is operable for overcoming the just described spring force to release the rod 40. Specifically, a cylindrical pneumatic piston assembly 80 comprises upper housing 82 and lower housing 84. When fastened together, the interiors of the upper and lower housing together define a cylindrical chamber 83. The upper housing 82 and lower housing 84 are fastened together and the actuator assembly 80 is attached to the brake housing 30 by screws 86a, 86b. Fluid port 88 extends through upper housing 82 to allow a fluid, such as air, to be delivered under pressure into the chamber 83. Any means for delivering fluid into the chamber via fluid port 88 may be employed.

Piston 90, which comprises a flat, round disk 92 and protruding contact 94, is disposed in the chamber 83. The center of lower housing 84 is provided with an opening 96 having a diameter sufficiently large to allow contact 94 of piston 90 to travel freely up and down therein.

A flexible diaphragm 92 is secured between the upper and lower housing 82, 84 and is located between the piston 90 and port 88. Preferably, the contacting surfaces 98a, 98b of upper housing 82 and lower housing 84, respectively, are grooved or otherwise machined to grip diaphragm 92 and seal the chamber 83 of the piston assembly 80.

Pressurized fluid entering the chamber of piston assembly 80 through fluid port 88 causes the diaphragm 92 to press against piston 90 and cause it to travel downwardly in the chamber. As a result, contact 94 exerts pressure against an upwardly protruding set screw 104 that is threaded into the lever arm 50, thereby forcing the end 47 of lever 46 away from bearing member 44. This relieves the pressure the lever normally exerts against bearing member 44, causing collar 32 to return to its original diameter and allowing it to rotate about rod 40. The position of the torso borne by the braking mechanism 10 can then be readily adjusted, either mechanically or by other means known in the art.

The distance travelled by lever 46 during operation of the braking mechanism can be controlled by adjustment members, specifically threaded set screws 100, 102, and 104. An end of set screws 102 and 104 is accessible to allow the position of each to be adjusted with a tool, the accessible end being hexagonally or otherwise shaped for easy adjustment. Set screw 100 provides a point of contact between lever 46 and plunger 61. Varying the position of set screw 100 against ball bearing 65 and head 63 of plunger 61 serves to adjust the force exerted by the spring-based plunger 61 against the lever 46.

Adjustment member 102 provides a stop point for the downward rotation of lever 46 in brake housing 30. Adjustment member 104 provides the point of contact of lever 46 with contact 94 of piston 90 and thus prevents the piston 90 from bottoming out in the chamber 83. Preferably, there is a plastic insert over the set screw threads to prevent the set screws 102 and 104 from turning once adjusted.

Normally, collar 32 is prevented from rotating about rod 40 due to the force of spring 64 pressing the head of plunger 61 against the arm of lever 46. This force is overcome when the piston assembly 80 causes contact 94 of piston 90 to exert a counteracting force against the arm of lever 46. When the fluid pressure in chamber 83 of piston assembly 80 is released, the force of spring 64 again serves to prevent further rotation and fix the braking mechanism 10 (and thus the torso of the dental simulator) in the desired position. It will be appreciated by one of ordinary skill that the brake mechanism may be used to support a weight (such as that carried by shaft 36) with the mechanism oriented on either side of a vertical plane through the center of rod 40.

It is preferred, however, that the mechanism be oriented with the housing 30 generally above the lever 46 (as can be considered when FIG. 2 is inverted). The frictional force between the collar 32 and the rod 40 is a function of the spring force applied. In the preferred orientation, when a downward force is applied to the brake housing, a moment is created about the rod 40. The relative motion of the housing (counterclockwise) and the shaft (clockwise) tends to tighten the collar 32 and add to the clamping force applied by the spring 64. Conversely, if the housing is rotated in the opposite (counterclockwise) direction, the frictional force between the collar 32 and the rod 40 tends to reduce the clamping force.

Figure 2A:
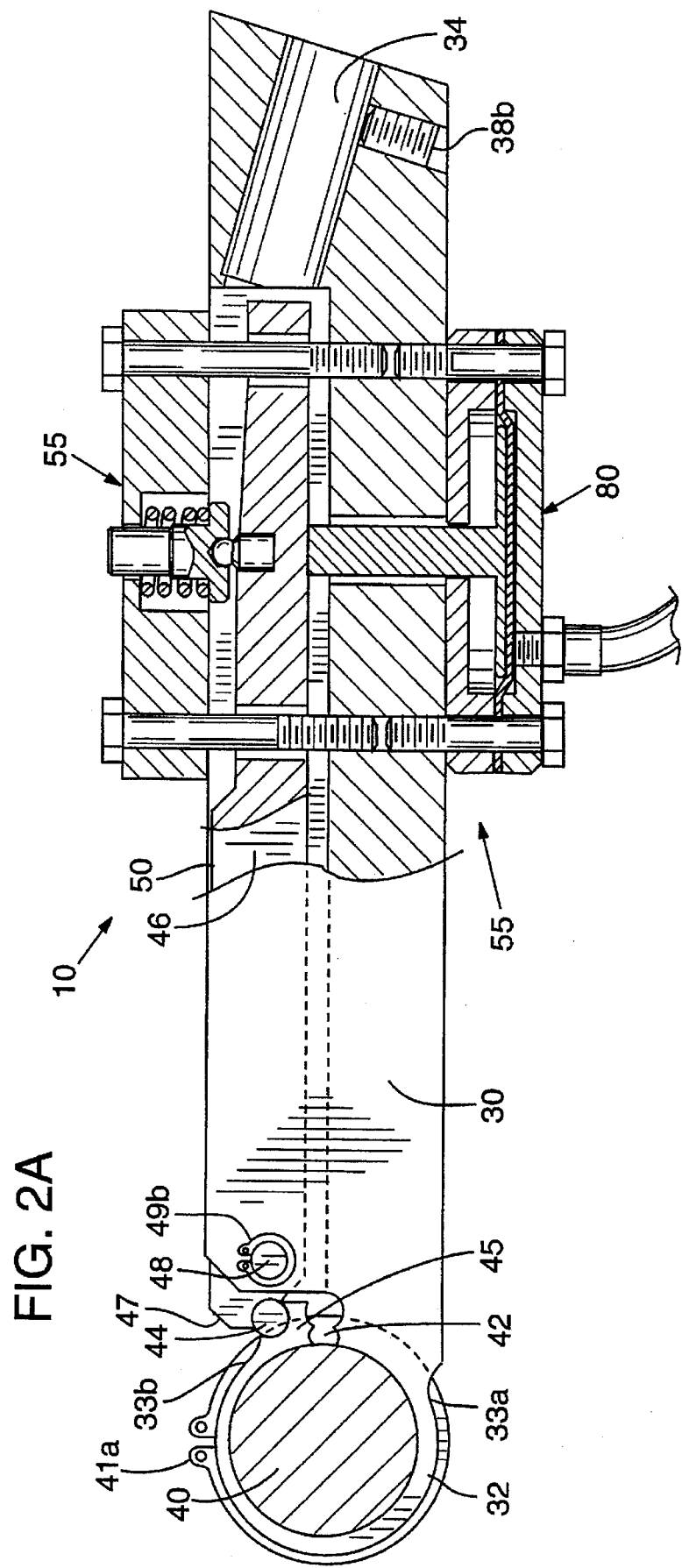
FIG. 2A shows an assembled braking mechanisms in side view with a cutaway view of the distal end of the mechanism wherein the brake is of the fluid pressure applied and spring released type.

Having illustrated and described the principles of the invention in a preferred embodiment, it should be apparent to those skilled in the art that the invention can be modified in arrangement and detail without departing from such principles. For example, the above-described orientations and functions of the spring member and actuator could be reversed, so that the actuator is actuated to move the lever to clamp the rod 40 and the spring moving the lever to release the rod when the actuator chamber is depressurized (FIG. 2a).

What is claimed is:

1. A brake for controlling rotational movement comprising:

a support member;

a deformable collar attached to the support member for clamping a rod therein;

a lever pivotally mounted on the support member adjacent to the collar, the lever having an end adjacent to the collar and an arm extending from the end;

a spring member mounted on the support member adjacent to the arm to normally force the lever to pivot in a first direction, thereby deforming the collar and clamping the rod therein; and an actuator member mounted on the support member adjacent to the arm that comprises a pneumatically driven piston that is extendable to urge the lever to pivot in a second direction opposite to the first direction, thereby causing the collar to release the rod.

2. The brake of claim 1 wherein the collar is resilient.

3. The brake of claim 1 further comprising an adjustable limit member mounted adjacent to the arm to limit the pivotal movement of the lever.

4. The brake of claim 3 wherein the spring member is adjustable so that the force exerted by the spring against the lever may be varied.

5. The brake of claim 1 wherein the spring member comprises a spring contact member, the spring member urging the spring contact member toward the lever, thereby forcing the lever to move pivotally in a first direction.

6. The brake of claim 1 wherein the collar is defined in the support member.

7. The brake of claim 1 wherein the collar has a thickness that gradually decreases from a thickest point to a thinnest point to distribute clamping stress applied by the collar.

8. A brake for controlling rotational movement comprising:

a support member;

a resilient deformable collar attached to the support member for clamping a rod therein;

a lever pivotally mounted on the support member and that has an end connected to the collar and an arm extending from the end; and an actuator member mounted on the support member and connected to the lever comprising a pneumatically driven piston that is extendable to urge the lever to pivot in a first direction, thereby exerting force on and deforming the collar to clamp the rod in the collar.

9. The brake according to claim 8 further comprising a spring member mounted on the support member and connected to the lever that urges the lever to pivot in a second direction opposite to the first direction to release the rod.

10. The brake of claim 8 wherein the collar is defined in the support member.

11. The brake of claim 8 wherein the collar has a thickness that gradually decreases from a thickest point to a thinnest point to distribute clamping stress applied by the collar.

12. A method for controlling rotational position rod, the method comprising the steps of:

disposing a rod within a deformable collar having a support member attached thereto;

pivotally mounting a lever on the support member such that one end of the lever is connected to the collar;

mounting a spring member on the support member such that the spring member is connected to the lever and acts to urge the lever to pivot, thereby deforming the collar and thereby clamping the rod therein;

mounting an actuator on the support member, operable to overcome the action of the spring; and changing the rotational position of the support member relative to the rod.

13. A brake for controlling movement of a rod or shaft comprising:

a deformable collar for clamping the rod or shaft, wherein the collar has a thickness that gradually decreases from a thickest point to a thinnest point to increase flexibility of the collar and uniformly distribute clamping stress applied by the collar;

a lever having an end connected to the collar and an arm extending from the end; and an actuator member connected to the arm and that is operable to urge the arm to pivot in a first direction to urge the lever to clamp the rod or shaft.

14. The brake of claim 13 further comprising a spring member that urges the lever to pivot in a second direction opposite to the first direction to release the rod or shaft.

15. The brake of claim 14 further comprising, a support member wherein the collar is attached to the support member, and the lever, the spring member, and the actuator member are mounted on the support member.

16. The brake of claim 13 wherein the actuator member comprises a pneumatically driven piston that is extendable to urge the lever to pivot in the first direction.

* * * * *